US012023576B1

(12) United States Patent
Tondee et al.

(10) Patent No.: US 12,023,576 B1
(45) Date of Patent: Jul. 2, 2024

(54) VIDEO GAME CONTROLLER

(71) Applicant: Performance Designed Products LLC, Burbank, CA (US)

(72) Inventors: Nicholas John Tondee, Poway, CA (US); Storm Orion, Poway, CA (US); Thomas John Roberts, Alpine, CA (US); Trevor Thomas Lehr, Alpine, CA (US)

(73) Assignee: Performance Designed Products LLC, Burbank, CA (US)

( * ) Notice: Subject to any disclaimer, the term of this patent is extended or adjusted under 35 U.S.C. 154(b) by 0 days.

(21) Appl. No.: 18/480,015

(22) Filed: Oct. 3, 2023

(51) Int. Cl.
*A63F 13/245* (2014.01)
*A63F 13/814* (2014.01)

(52) U.S. Cl.
CPC .......... *A63F 13/245* (2014.09); *A63F 13/814* (2014.09)

(58) Field of Classification Search
CPC .............................. A63F 13/245; A63F 13/814
See application file for complete search history.

(56) References Cited

U.S. PATENT DOCUMENTS

| | | |
|---|---|---|
| 3,012,800 A | 12/1961 | Koch |
| 4,073,211 A | 2/1978 | Jorgensen |
| 4,686,882 A | 8/1987 | Shaw |
| 5,353,672 A | 10/1994 | Stewart |
| 5,928,028 A | 7/1999 | Orsley |
| 5,929,362 A | 7/1999 | Oteyza |
| 6,028,255 A | 2/2000 | Myronyk |
| 6,198,030 B1 | 3/2001 | Rose |
| 6,225,547 B1 | 5/2001 | Toyama et al. |
| 7,375,267 B2 | 5/2008 | Poschelk |
| 7,435,178 B1 | 10/2008 | Tam et al. |
| 7,598,449 B2 | 10/2009 | Sullivan |
| 8,182,342 B2 | 5/2012 | Guinchard et al. |
| 8,975,501 B2 | 3/2015 | Roebke |
| 9,633,871 B2 | 4/2017 | Hatano |
| 9,908,042 B2 | 3/2018 | Fulghum et al. |
| 9,908,043 B2 | 3/2018 | Fulghum et al. |
| 9,914,050 B2 | 3/2018 | Fulghum et al. |
| 2002/0152659 A1 | 10/2002 | Hartill |
| 2003/0164080 A1 | 9/2003 | Childress |

(Continued)

FOREIGN PATENT DOCUMENTS

| | | |
|---|---|---|
| JP | 2001096061 A | 4/2001 |
| WO | WO 9945528 A1 | 9/1999 |

OTHER PUBLICATIONS

Tom's Hardware, Your Old 'Rock Band' Gear Will With Work With Oculus Touch, 'Rock Band VR'. https://www.tomshardware.com/news/rock-band-vr-oculus-touch,32781.html. Sep. 29, 2016. (Year: 2016).*

(Continued)

*Primary Examiner* — Reginald A Renwick
(74) *Attorney, Agent, or Firm* — Knobbe, Martens, Olson & Bear LLP

(57) ABSTRACT

A video game controller includes a body having a shape that resembles a guitar body, a neck and a headstock, the neck extending between the body and the headstock. The neck has fret buttons or action buttons on one side of the neck and has a thumbstick on an opposite side of the neck proximate at least one of the fret buttons or action buttons to allow a user to operate the fret buttons or action buttons and thumbstick simultaneously with the same hand.

20 Claims, 8 Drawing Sheets

(56) References Cited

U.S. PATENT DOCUMENTS

| | | |
|---|---|---|
| 2004/0244569 A1 | 12/2004 | Teuffel |
| 2006/0123971 A1 | 6/2006 | Moghaddam |
| 2006/0230913 A1 | 10/2006 | Liao |
| 2006/0246779 A1 | 11/2006 | Helbok |
| 2007/0151381 A1 | 7/2007 | Pelkonen |
| 2008/0220864 A1 | 9/2008 | Brosius et al. |
| 2009/0088250 A1 | 4/2009 | Carlson |
| 2009/0126152 A1 | 5/2009 | Potter |
| 2009/0156306 A1 | 6/2009 | Guinchard |
| 2009/0212377 A1* | 8/2009 | Vaganov .............. G06F 3/0338 257/E29.324 |
| 2009/0258686 A1 | 10/2009 | Mccauley |
| 2009/0288547 A1 | 11/2009 | Lazovic |
| 2010/0009749 A1 | 1/2010 | Chrzanowski, Jr. |
| 2010/0033426 A1 | 2/2010 | Grant |
| 2010/0184514 A1* | 7/2010 | Tsai ...................... A63F 13/24 463/37 |
| 2010/0304865 A1 | 12/2010 | Picunko |
| 2011/0028218 A1 | 2/2011 | Gomes |
| 2011/0218022 A1* | 9/2011 | Chiu ...................... G06F 17/00 463/7 |
| 2011/0269543 A1 | 11/2011 | Johnson |
| 2013/0190092 A1 | 7/2013 | Adams |
| 2014/0174227 A1 | 6/2014 | Hsu |
| 2015/0165309 A1 | 6/2015 | Jackson |
| 2015/0237711 A1 | 8/2015 | Rogers |
| 2016/0090763 A1 | 3/2016 | Hsu |

OTHER PUBLICATIONS

Imgur. https://imgur.com/lalG3dD. Jan. 17, 2020. (Year: 2020).*
Imgur. https://imgur.com/oNhNOZ5. Jan. 17, 2020. (Year: 2020).*
Reddit. "Scuffed RockBand VR setup (will probably make a good setup soon lol." https://www.reddit.com/r/WindowsMR/comments/epdjda/scuffed_rockband_vr_setup_will_probably_make_a/. 2020. (Year: 2020).*
Amazon. "Rock Band 4 Wireless Fender Stratocaster Guitar Controller for Xbox One—Black." https://www.amazon.com/Wireless-Fender-Stratocaster-Controller-Xbox-One/dp/B017KIHHH8/ref=dp_fod_sccl_2/131-4377208-6619413. Nov. 23, 2015. (Year: 2015).*

* cited by examiner

VIDEO GAME CONTROLLER

BACKGROUND

Field

The present invention is directed to a video game controller, and more particularly to a guitar-shaped video game controller.

Description of the Related Art

Video games allow users to provide inputs through a controller to play the game. Such video games include music video games that allow users to simulate the performance of a song by playing the game with controllers that resemble musical instruments, such as guitars.

SUMMARY

There is a need for an improved guitar shaped video game controller.

In accordance with one aspect, a video game controller is provided. The controller comprises a body having a shape that resembles a guitar body, a neck and a headstock, the neck extending between the body and the headstock. The neck can have "action" buttons on one side of the neck and have a thumbstick on an opposite side of the neck from the "action" buttons to allow a user to operate the activity buttons and thumbstick simultaneously with the same hand.

In accordance with one aspect of the disclosure, a video game controller is provided. The video game controller comprises a body having a shape that resembles a guitar body and one or more control inputs. The video game controller also comprises a neck extending from a proximal end attached to the body and a distal end, the neck having one or more action buttons on one surface of the neck, and a headstock attached to the distal end of the neck. The video game controller also comprises a thumbstick disposed on an opposite surface of the neck and proximate at least one of the one or more action buttons, the thumbstick configured to be actuatable simultaneously with the one or more action buttons by a user's hand.

In accordance with one aspect of the disclosure, a video game controller is provided. The video game controller comprises a body having a shape that resembles a guitar body. The video game controller also comprises a neck attached to the body and having one or more action buttons on a front surface of the neck, and a headstock attached to an opposite end of the neck from the body. The video game controller also comprises a thumbstick disposed in a recess of a rear surface of the neck and proximate at least one of the one or more action buttons, the thumbstick configured to be actuatable simultaneously with the one or more action buttons by a user's hand.

DETAILED DESCRIPTION

Figure 1:
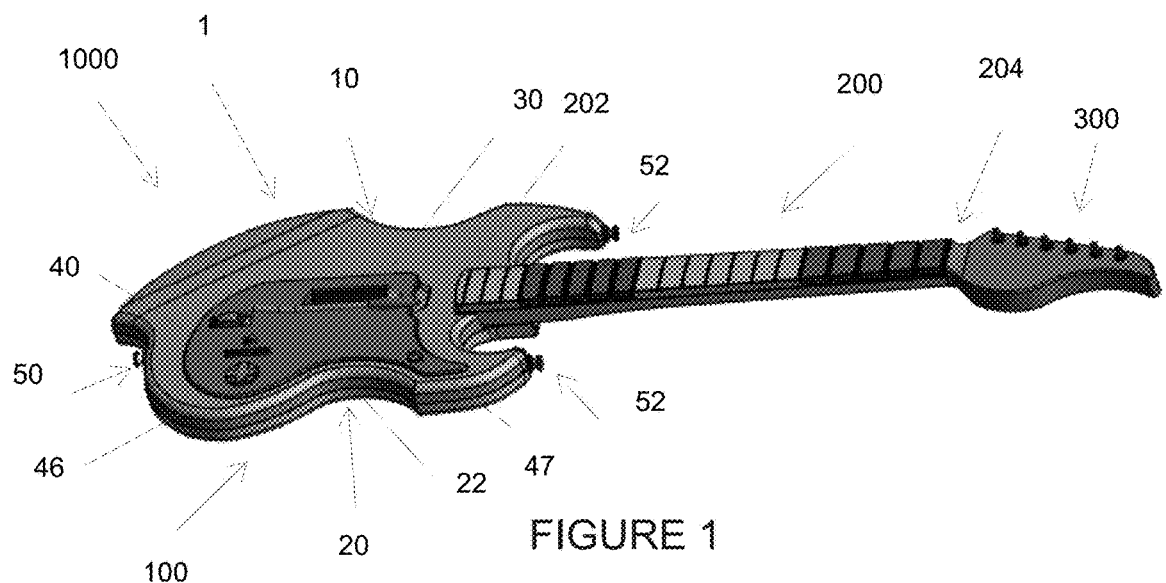
FIG. 1 is a perspective front view of a video game controller.

FIGS. 1-8B show a video game controller. The video game controller is a guitar-shaped video game controller 1000 ("controller"). The controller 1000 can be used with multiple platforms, such as, for example, PlayStation®, Xbox®, as well as personal computer (PC) and other platforms, such as Samsung TV and mobile via Bluetooth®. The controller 1000 has a body 100, a neck 200 and a headstock 300, the neck 200 attached to the body 100 and attached to the headstock 300.

The body 100 has a shape resembling a body of the guitar and includes a front surface or cabinet 10 and a rear surface or cabinet 20. The controller 1000 includes one or more control inputs 1, optionally including a whammy bar 22, a strum bar 30, one or more input buttons 40, a D-pad 46 and a guide button 47. The body 100 can have strap pegs 50, 52 that can couple to a strap.

The neck 200 has a shape that resembles a neck of a guitar and can have a front surface or cabinet 210 and rear surface or cabinet 220 and extends from a proximal portion 202 to a distal portion 204. The neck 200 includes a fret board 205 with fretboard dots 240 and a plurality of fret buttons 230 or action buttons (e.g., on a front side of the neck 200). The headstock 300 has a shape that resembles a headstock of a guitar. Therefore, a user playing a video game with the controller 1000 can pretend they are playing an actual guitar while playing the video game (e.g., by pressing the fret buttons 230 or action buttons, for example based on the rhythm of a song in a video game such as Guitar Hero).

Figure 2:
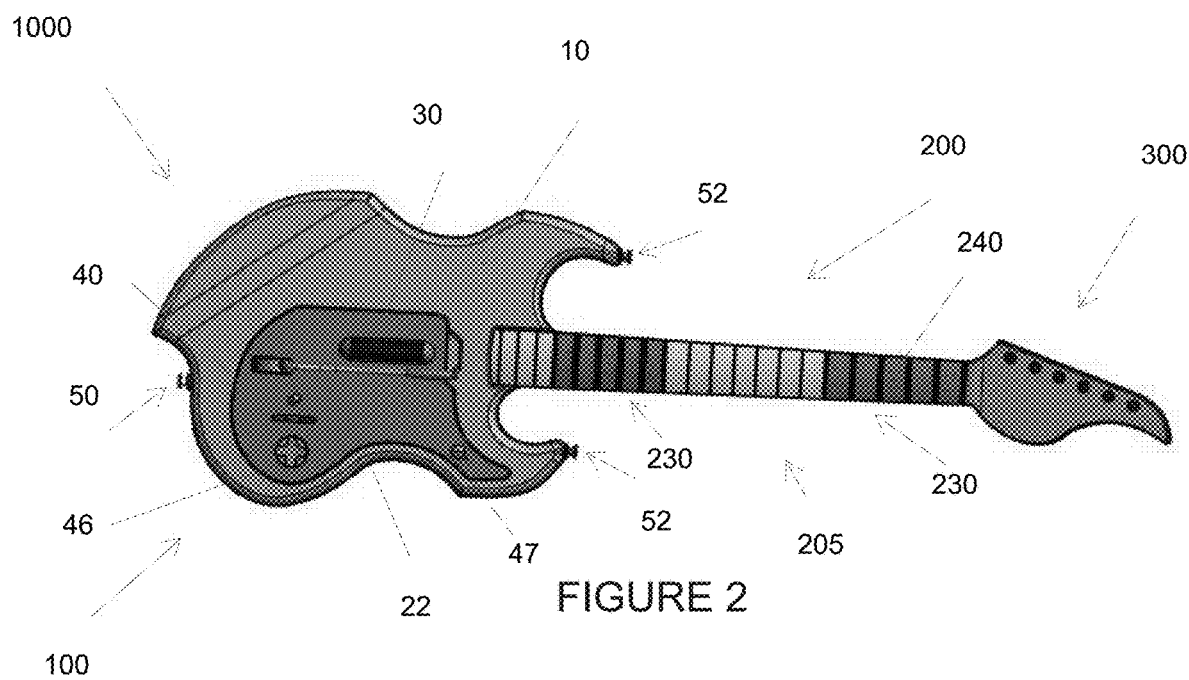
FIG. 2 is a front view of the video game controller of FIG. 1.
Figure 3:
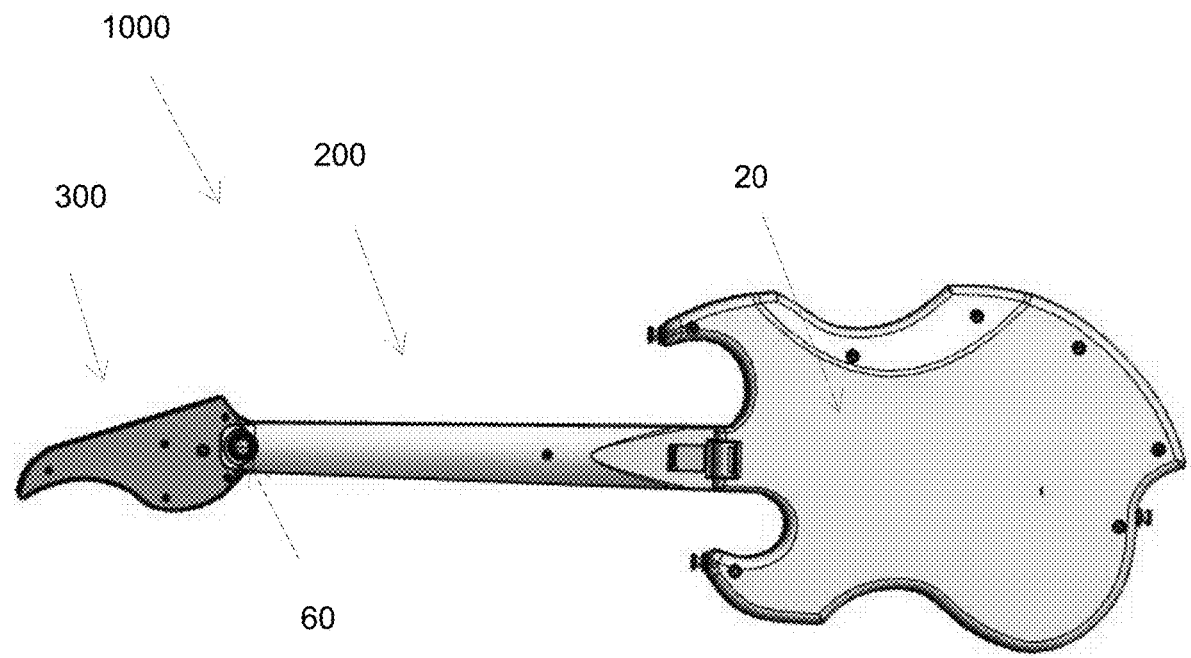
FIG. 3 is a rear view of the video game controller of FIG. 1.
Figure 4:
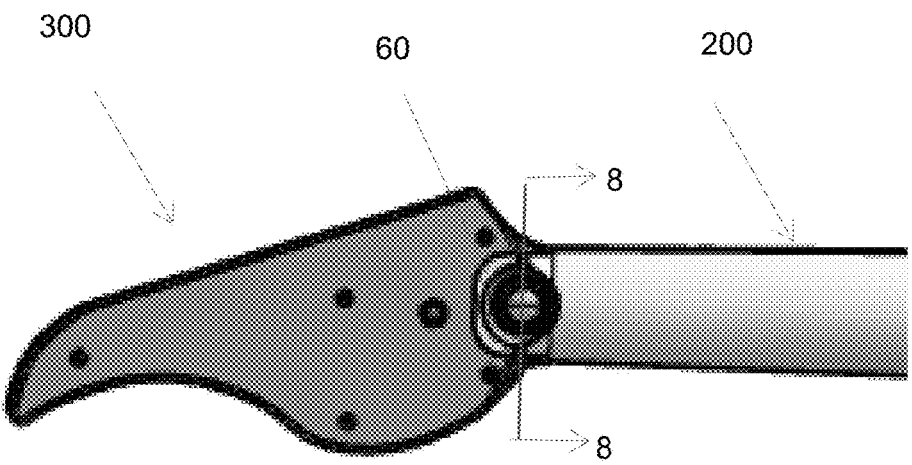
FIG. 4 is a partial rear view of the video game controller of FIG. 1.
Figure 5:
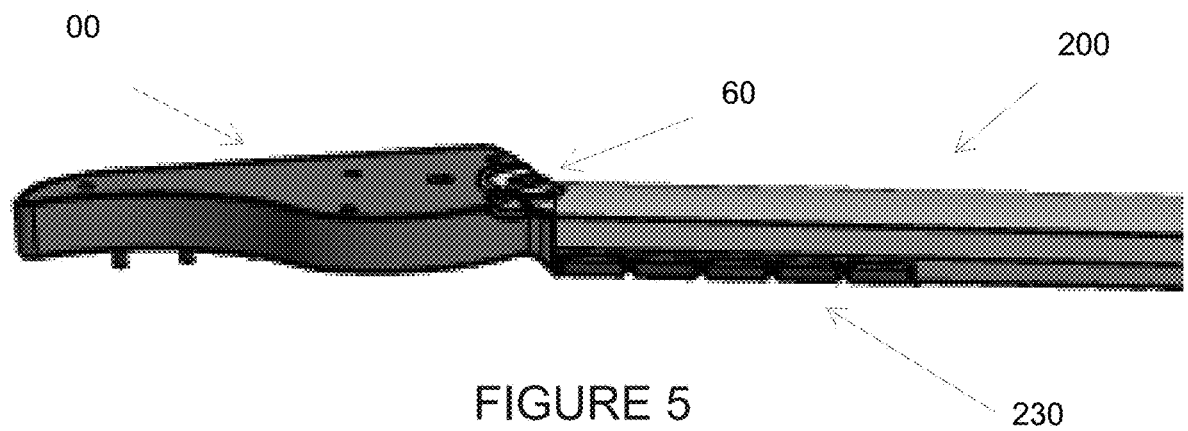
FIG. 5 is a partial perspective rear view of the video game controller of FIG. 1.
Figure 6A:
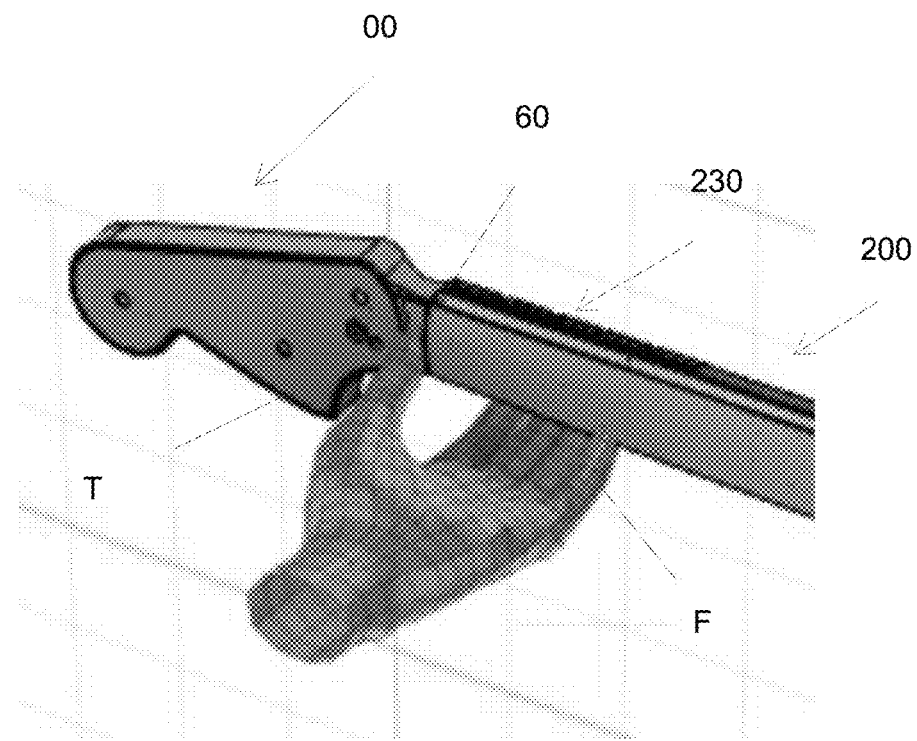
FIG. 6A is another partial perspective rear view of the video game controller of FIG. 1 in one example operation mode.
Figure 6B:
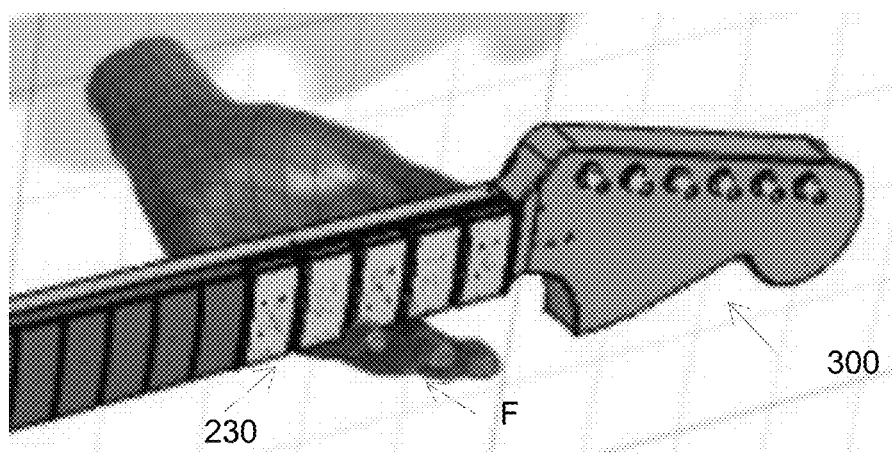
FIG. 6B is a partial perspective front view of the video game controller of FIG. 6A in said one example operation mode.

With references to FIG. 2, the controller 1000 can have a thumbstick 60 (e.g., an analog thumbstick). The thumbstick 60 can in one example have a rubber overmold. In another example, the thumbstick 60 can have a thermoplastic elastomer (TPE) overmold. The thumbstick 60 can be disposed on the neck 200. In one implementation, the thumbstick 60 can be disposed on a side (e.g., rear side) of the neck 200 opposite the side (e.g., front side) of the neck 200 that has the fret buttons 230 or action buttons (e.g., the thumbstick 60 is disposed opposite the fret buttons 230 or action buttons). In one implementation, shown in FIGS. 3-5 the thumbstick 60 is on the rear side of the neck 200 proximate the headstock 300. As shown in FIG. 5, the thumbstick 60 is aligned adjacent the fret buttons 230 or action buttons (e.g., when viewing the neck 200 from a side perpendicular to the front or rear side of the neck 200). Advantageously, the thumbstick 60 is located so that a user can simultaneously actuate the fret buttons 230 or action buttons and the thumbstick 60 with one hand, as shown in FIGS. 6A-6B (e.g., where the user can actuate the thumbstick 60 with a thumb T and actuate the fret buttons 230 or action buttons with the fingers of the same hand). In one implementation, the user can actuate the thumbstick 60 to navigate or move an avatar point of view while playing the video game.

Figure 7:
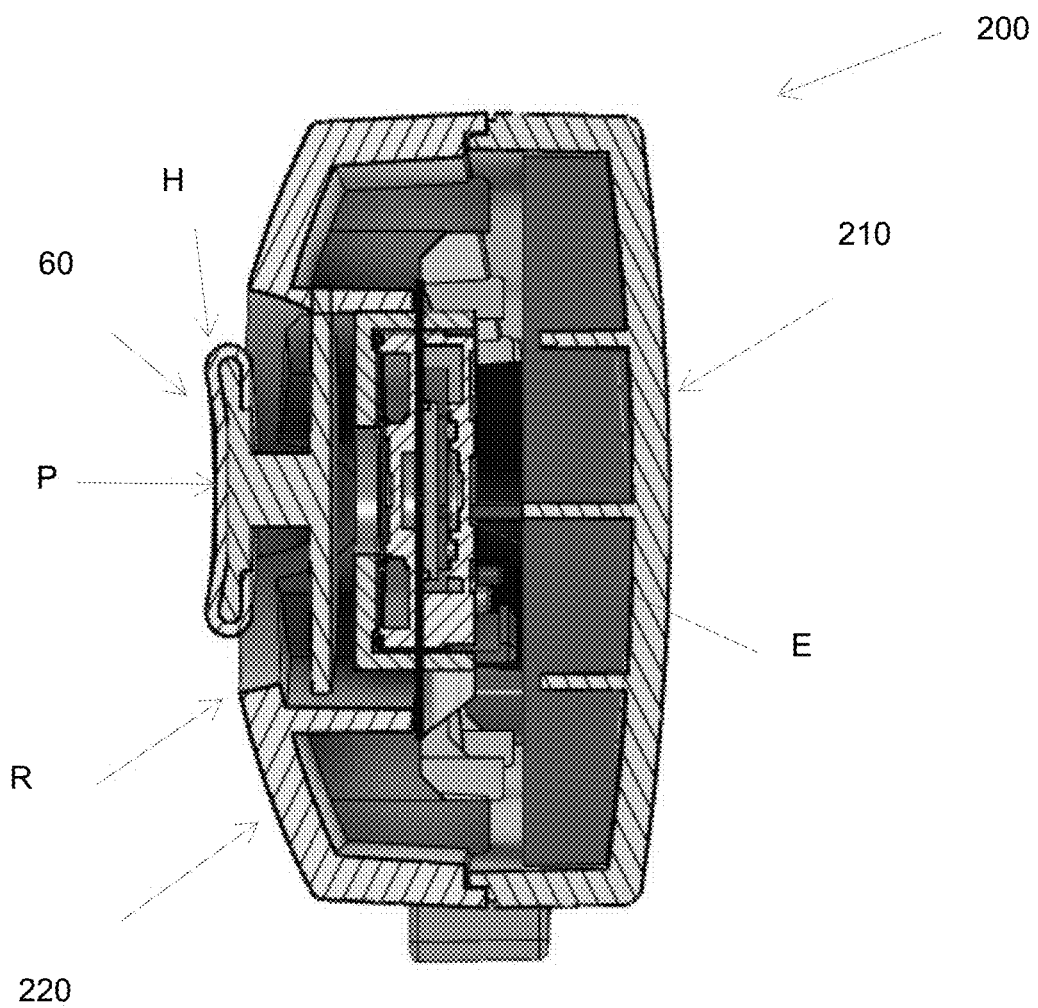
FIG. 7 is cross-sectional view of a neck of the video game controller of FIG. 4 along line 8-8.
Figure 8A:
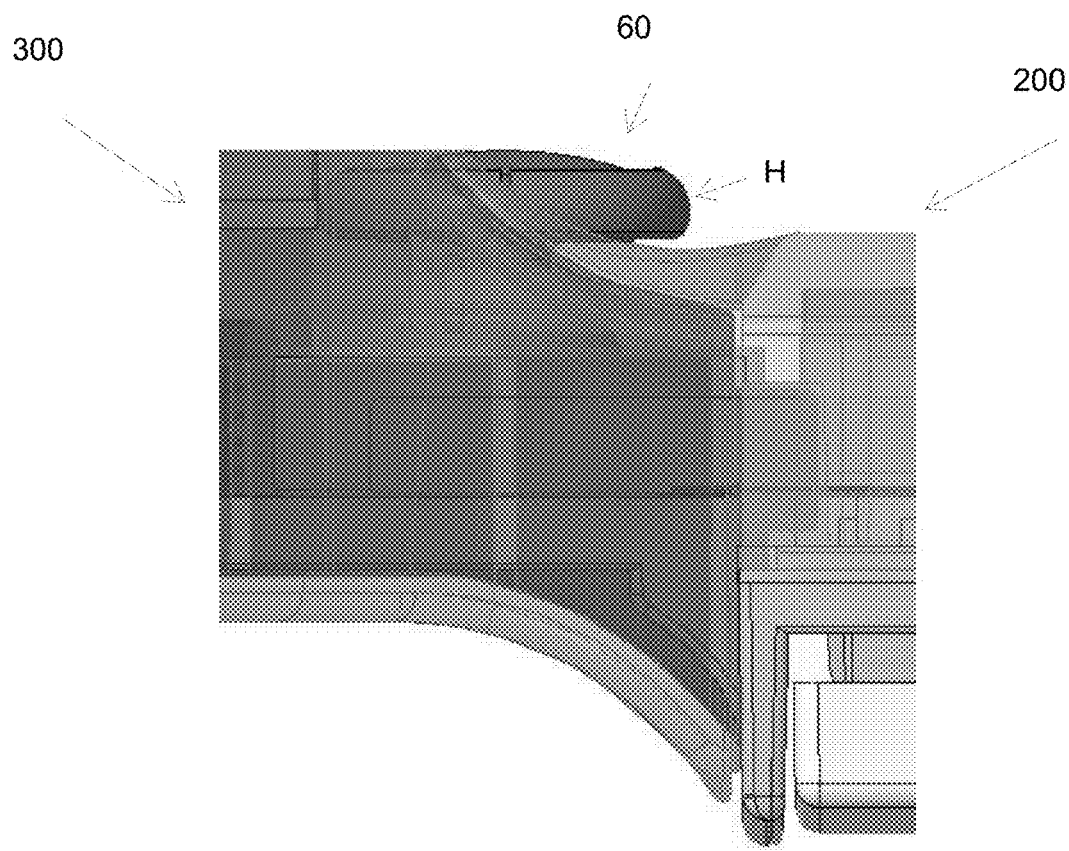
FIG. 8A is a partial side view of the video game controller of FIG. 4 along line 8-8 with the thumbstick in a default position.
Figure 8B:
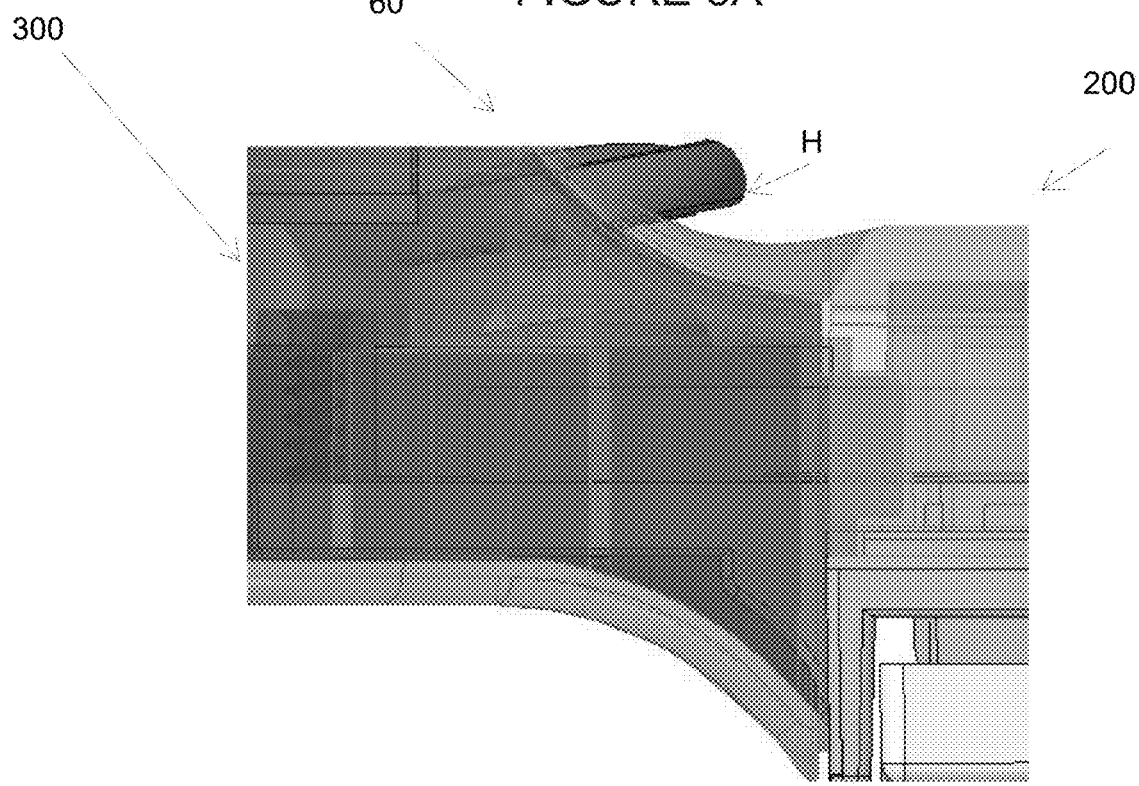
FIG. 8B is a side view of the video game controller of FIG. 4 along line 8-8 with the thumbstick in a pivoted position.

With reference to FIGS. 7-8B, the thumbstick 60 is disposed in a recess R of the rear surface or cabinet 220 of the neck 200 so that the head H of the thumbstick 60 does not protrude significantly out of the recess R (e.g., is flush with he rear surface or cabinet 220 of the neck 200 when in a neutral position) to advantageously inhibit (e.g., prevent) inadvertent actuation of the thumbstick 60 as the user moves their hand along the neck 200 while playing a video game. In one example, the head H of the thumbstick 60 can protrude between about 1 mm and about 2 mm past the rear surface or cabinet 220 of the neck 200 when articulated to the maximum position. The thumbstick 60 is an analog stick and pivoting the thumbstick 60. The user can pivot the thumbstick 60 from a neutral or default position (shown in FIG. 8A) to an actuated or angled position (shown in FIG. 8B) by pushing the head H of the thumbstick 60 in a direction (X-Y) perpendicular to the axis of the thumbstick 60. The thumbstick 60 can also be pressed P in the direction of its axis (as shown in FIG. 7) to actuate digital electronics E.

Figure 9:
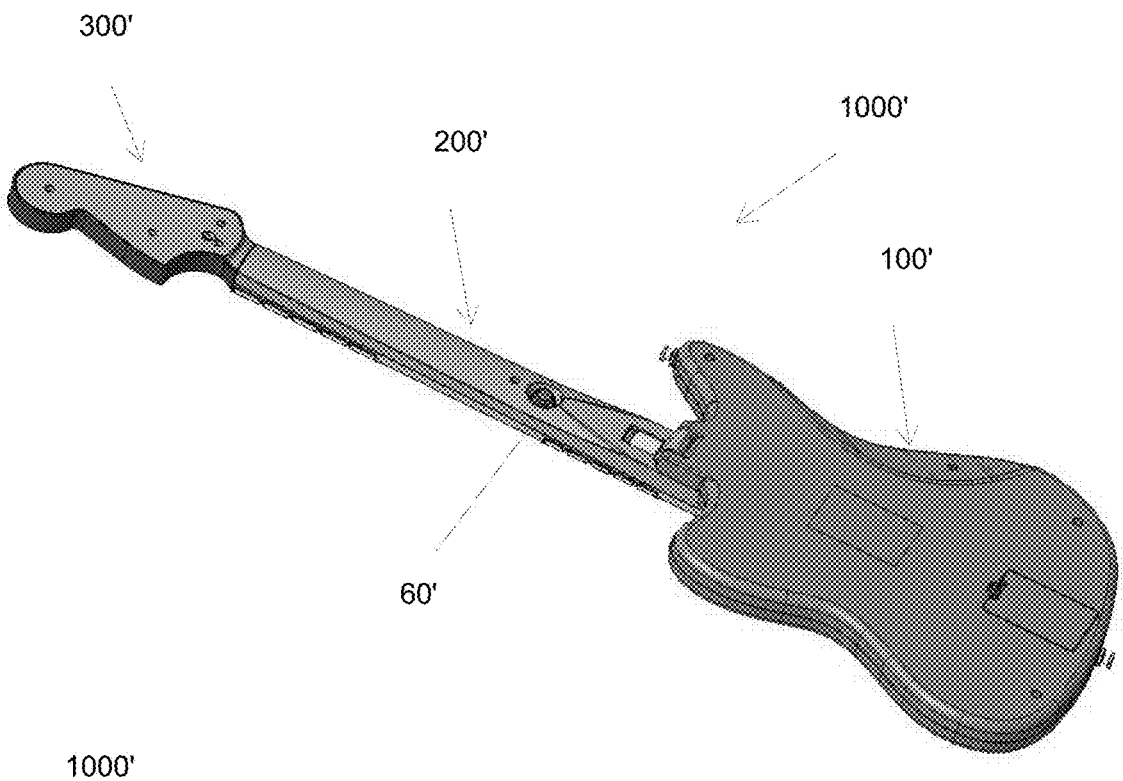
FIG. 9 is a perspective rear view of a video game controller.
Figure 10:
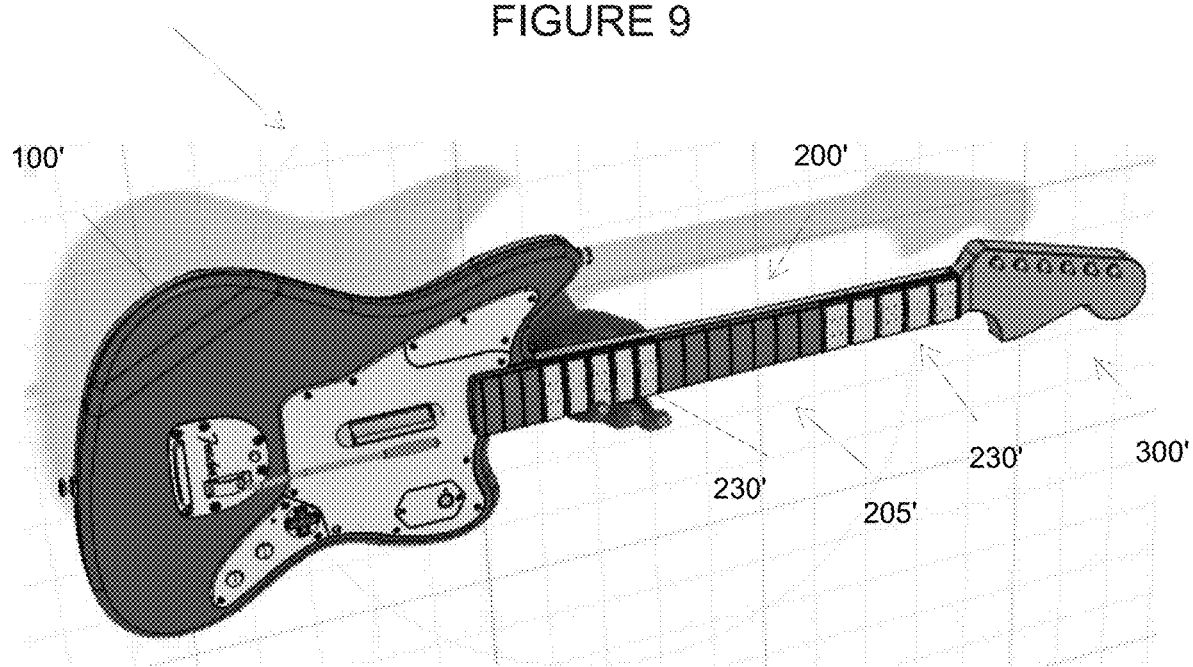
FIG. 10 is a perspective front view of the video game controller in FIG. 10.
Figure 11:
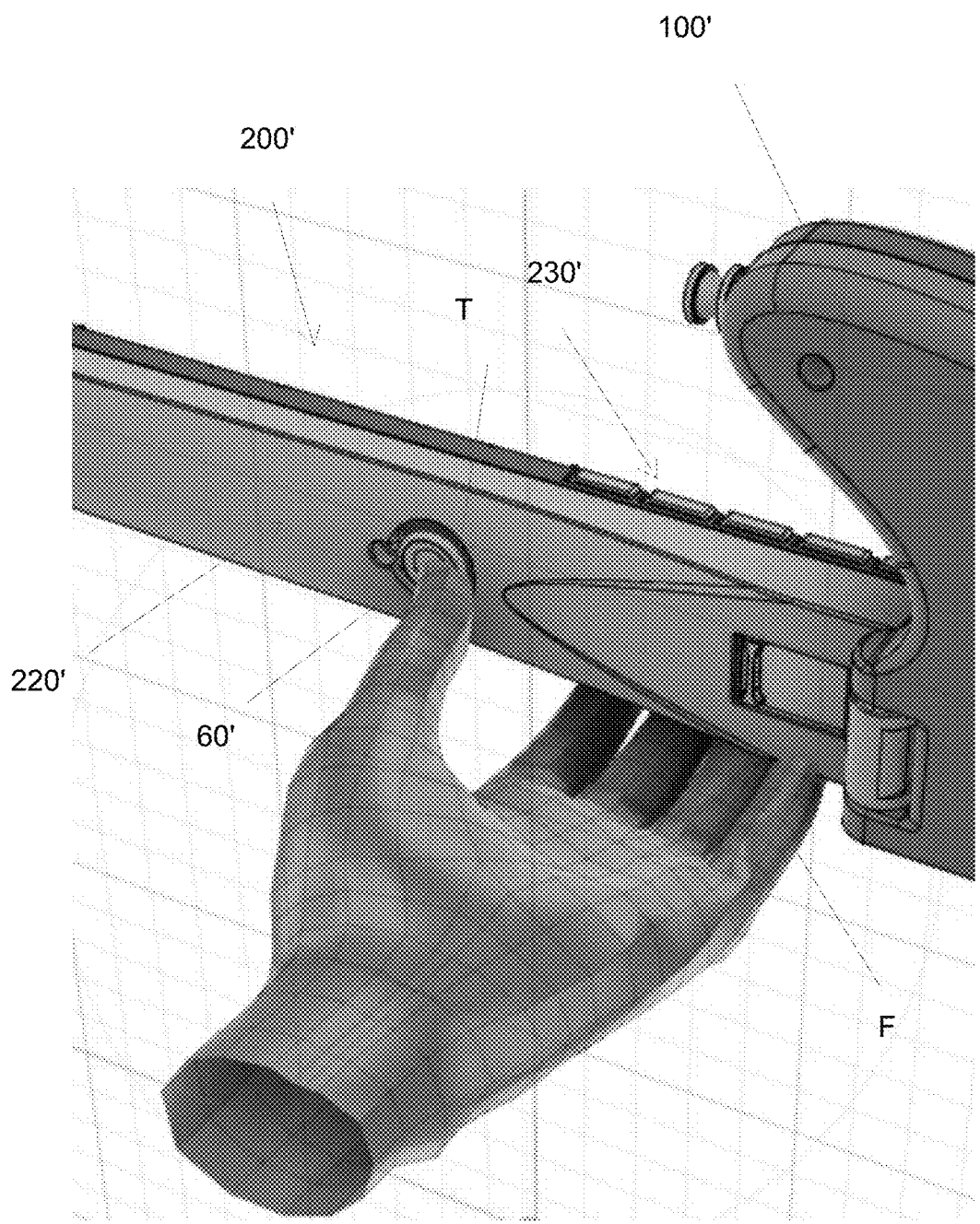
FIG. 11 is a partial perspective rear review of the video game controller in FIG. 10 in one example operation mode.

FIGS. 9-11 show a video game controller 1000' (hereafter "the controller 1000'"). The controller 1000' is similar to the controller 1000 in FIGS. 1-8B. Thus, reference numerals used to designate the various components of the controller 1000' are identical to those used for identifying the corresponding components of the controller 1000 in FIGS. 1-8B, except that a "'" has been added to the end of the numerical identifier. Therefore, the structure and description for the various features and components of the controller 1000' and how they're operated and controlled in FIGS. 1-8B are understood to also apply to the corresponding features of the controller 1000' in FIGS. 9-11, except as described below.

The controller 1000' differs from the controller 1000 in that the thumbstick 60' is disposed on the rear surface or cabinet 220' of the neck 200' opposite the fret buttons 230 or action buttons that are proximate the body 100' (e.g., the thumbstick 60' is opposite and spaced from, such as aligned adjacent, the fret buttons 230 or action buttons 230). As shown in FIG. 11, a user can advantageously simultaneously actuate the fret buttons 230 or action buttons and actuate the thumbstick 60' with the same hand (e.g., actuate the fret buttons 230 or action buttons with the fingers and actuate the thumbstick 60' with the thumb T of the same hand). In another implementation, the video game controller can have more than one thumbstick 60, 60' on the rear surface or cabinet 220, 220' of the neck 200, 200' (e.g., have a thumbstick 60 proximate the headstock 300 and also have a thumbstick 60' proximate the body 100').

Figure 12:
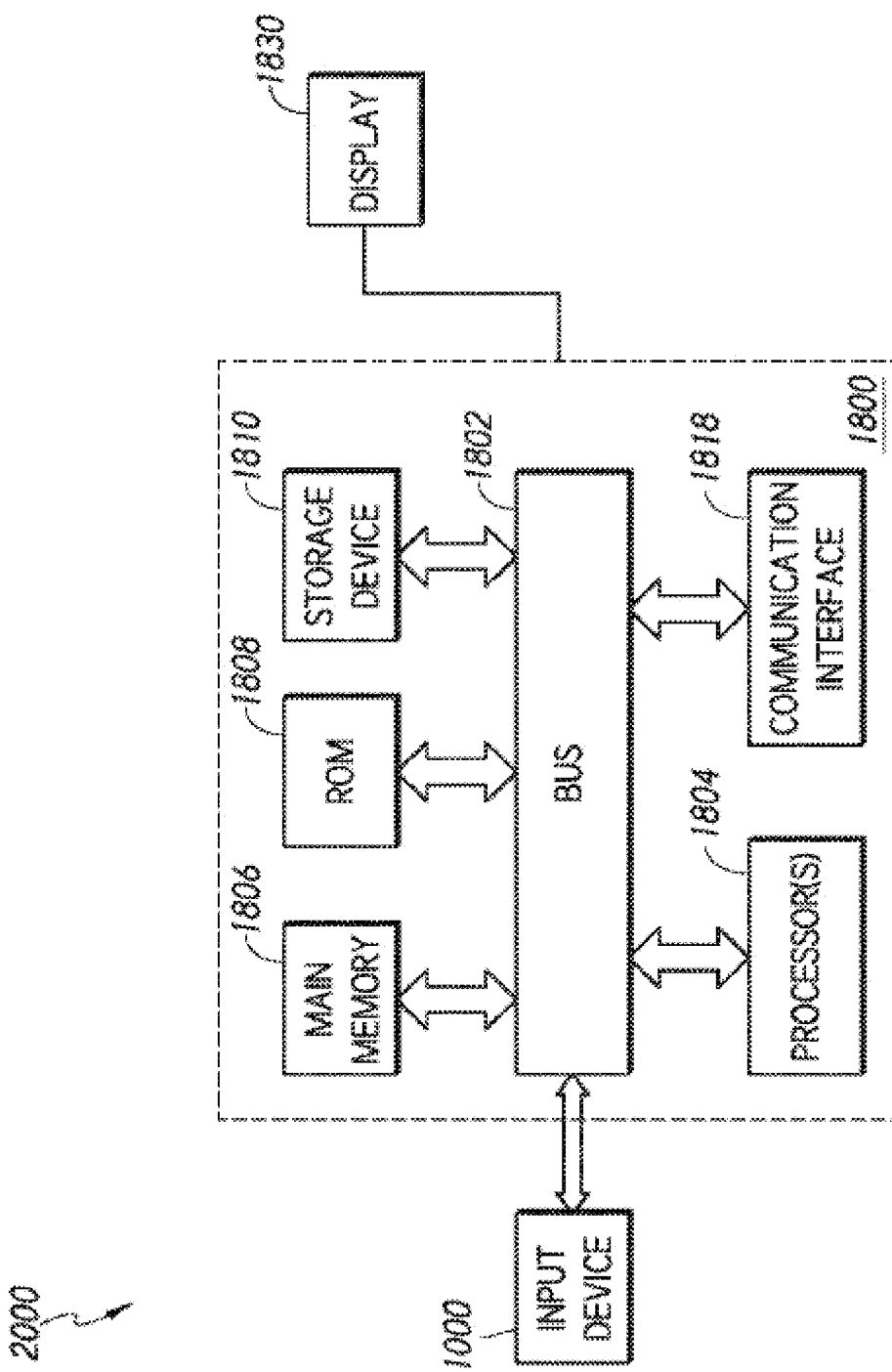
FIG. 12 is a schematic block diagram of a video game system that includes a video game controller.

FIG. 12 shows a block diagram of a video game system 2000 utilizing the video game controller 1000. The system 2000 includes a console 1800 that communicates with the controller 1000 via a wired or wireless connection. The console 1800 can include a bus 1802, one or more processors 1804, a main memory 1806, a read-only memory (ROM) 1808, a storage device 1810 and a communication interface 1818. The one or more processors 1804 can execute video game instructions, for example in a memory 1806 or ROM 1808 that communicates with the one or more processors 1804. The instructions can be stored in the storage device 1810 and transferred to the memory 1806 and/or ROM 1808 as commanded by the processor(s) 1804. The console 1800 can receive inputs from the controller 1000 (i.e., from the user pressing on the fret buttons 230 or operating the whammy bar 22 or strum bar 30), and can communicate with a display 1830 via the communication interface 1818 to provide display data (e.g., images) to the display (e.g., computer monitor, television, etc.).

Although this disclosure describes certain embodiments and examples of video game controllers, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. Indeed, a wide variety of designs and approaches are possible and are within the scope of this disclosure. No feature, structure, or step disclosed herein is essential or indispensable. Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The language of the claims is to be interpreted broadly based on the language employed in the claims and not limited to the examples described in the present specification or during the prosecution of the application, which examples are to be construed as non-exclusive.

Some embodiments have been described in connection with the accompanying drawings. However, the figures are not drawn to scale, unless indicated otherwise. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various illustrative embodiments and examples of video game controllers have been disclosed. Although the video game controllers have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above but should be determined only by a fair reading of the claims that follow as well as their full scope of equivalents.

What is claimed is:

1. A video game controller, comprising:
    a body having a shape that resembles a guitar body and one or more control inputs;
    a neck extending from a proximal end attached to the body and a distal end, the neck having one or more action buttons on one surface of the neck;
    a headstock attached to the distal end of the neck; and
    a thumbstick disposed on an opposite surface of the neck and proximate at least one of the one or more action buttons, the thumbstick configured to be actuatable simultaneously with the one or more action buttons by a user's hand.

2. The video game controller of claim 1, wherein the thumbstick is an analog thumbstick.

3. The video game controller of claim 1, wherein the thumbstick is disposed proximate the headstock.

4. The video game controller of claim 1, wherein said at least one of the one or more action buttons are disposed proximate the headstock.

5. The video game controller of claim 1, wherein the thumbstick is disposed in a recess of a rear surface of the neck to inhibit inadvertent actuation of the thumbstick.

6. The video game controller of claim 5, wherein a head of the thumbstick protrudes from the rear surface of the neck by a distance of between 1 mm and 2 mm when articulated.

7. The video game controller of claim 1, wherein the thumbstick is disposed proximate the body.

8. The video game controller of claim 1, wherein said at least one of the one or more action buttons are disposed proximate the body.

9. The video game controller of claim 1, wherein the one or more action buttons include a first set of action buttons proximate the body and a second set of action buttons proximate the headstock.

10. The video game controller of claim 1, wherein the one or more control inputs includes a whammy bar, a strum bar, one or more input buttons or a D-pad.

11. A video game controller, comprising:
    a body having a shape that resembles a guitar body;
    a neck attached to the body, the neck having one or more action buttons on a front surface of the neck;
    a headstock attached to an opposite end of the neck from the body; and
    a thumbstick disposed in a recess of a rear surface of the neck and proximate at least one of the one or more action buttons, the thumbstick configured to be actuatable simultaneously with the one or more action buttons by a user's hand.

12. The video game controller of claim 11, wherein the thumbstick is an analog thumbstick.

13. The video game controller of claim 11, wherein the thumbstick is disposed proximate the headstock.

14. The video game controller of claim 11, wherein said at least one of the one or more action buttons are disposed proximate the headstock.

15. The video game controller of claim 11, wherein the thumbstick is disposed in the recess to inhibit inadvertent actuation of the thumbstick.

16. The video game controller of claim 15, wherein a head of the thumbstick protrudes from the rear surface of the neck by a distance of between 1 mm and 2 mm when articulated.

17. The video game controller of claim 11, wherein the thumbstick is disposed proximate the body.

18. The video game controller of claim 11, wherein said at least one of the one or more action buttons are disposed proximate the body.

19. The video game controller of claim 11, wherein the one or more action buttons include a first set of action buttons proximate the body and a second set of action buttons proximate the headstock.

20. The video game controller of claim 11, further comprising one or more control inputs chosen from a group consisting of a whammy bar, a strum bar, one or more input buttons and a D-pad.

* * * * *